United States Patent
Donohue (10) Patent No.: US 12,197,629 B2
(45) Date of Patent: Jan. 14, 2025

(54) STORAGE DEVICE AND DATA ACCESS METHOD

(71) Applicant: Cortina Access, Inc., San Jose, CA (US)

(72) Inventor: Ryan Patrick Donohue, San Jose, CA (US)

(73) Assignee: REALTEK SINGAPORE PRIVATE LIMITED, Singapore (SG)

( * ) Notice: Subject to any disclaimer, the term of this patent is extended or adjusted under 35 U.S.C. 154(b) by 388 days.

(21) Appl. No.: 17/574,670

(22) Filed: Jan. 13, 2022

(65) Prior Publication Data

US 2023/0222252 A1    Jul. 13, 2023

(51) Int. Cl.
| | |
|---|---|
| *G06F 21/75* | (2013.01) |
| *G06F 7/58* | (2006.01) |
| *G06F 21/60* | (2013.01) |
| *G06F 21/79* | (2013.01) |

(52) U.S. Cl.
CPC ............ *G06F 21/755* (2017.08); *G06F 7/588* (2013.01); *G06F 21/602* (2013.01); *G06F 21/79* (2013.01)

(58) Field of Classification Search
CPC ...... G06F 21/755; G06F 21/602; G06F 21/79; G06F 21/81; G06F 21/82
See application file for complete search history.

(56) References Cited

U.S. PATENT DOCUMENTS

| | | | | |
|---|---|---|---|---|
| 2005/0094464 A1* | 5/2005 | Gammel | ............. | G06Q 20/105 |
| | | | | 711/E12.07 |
| 2013/0086303 A1* | 4/2013 | Ludwig | .................. | G06F 16/13 |
| | | | | 711/E12.008 |
| 2014/0344321 A1* | 11/2014 | Hamilton | ................ | G06F 7/588 |
| | | | | 708/255 |

FOREIGN PATENT DOCUMENTS

TW        200306474 A    11/2003

\* cited by examiner

*Primary Examiner* — Esther B. Henderson
(74) *Attorney, Agent, or Firm* — McClure, Qualey & Rodack, LLP (57) ABSTRACT

A storage device and a data access method are provided. The storage device includes a primary storage unit and at least one additional unit. The primary storage unit includes: a primary memory element configured to store secret data and a primary access unit configured to receive an external access command. Each additional unit is configured to receive the external access command. Each additional unit includes: an additional memory element configured to store non-specific data, a local access generation element configured to trigger generating an internal access command based on the external access command, and an additional access unit configured to receive a local access command. The primary storage unit and each additional unit are coupled to a same power rail and a connection wire to simultaneously receive the external access command to parallelly (simultaneously) access the secret data and the non-specific data stored in each additional unit.

19 Claims, 6 Drawing Sheets

STORAGE DEVICE AND DATA ACCESS METHOD

BACKGROUND

Technical Field

The present invention relates to a storage device and a data access method, and in particular, to a storage device and a data access method that can protect secret data stored in the storage device from power attack.

Related Art

In many electronic systems, some key secret data is stored in the storage device of the electronic device. These secret data may be passwords, decryption keys, version control information, media authorization, personal information, financial data, or the like. In order to protect these secret data, the access rights of the storage devices are usually restricted to entities with special access rights (such as certain central processing units). Despite these precautions, many attackers still try to access secret data stored in the storage device. A common attack method is power voltage analysis. In this type of attack, the power voltage at the microvolt level is monitored. When the central processing unit performs access to the secret data of the storage device, these access operations will produce tiny power voltage offsets. These tiny power voltage offsets will provide faint indications of the data being written/read. Repeated accesses to the secret data separate these faint spikes from other system noise reflected in the power supply noise, so that the secret data can be recovered.

SUMMARY

In view of this, the present invention provides a storage device and a data access method to improve the existing technical problems.

An embodiment of the present invention provides a storage device. The storage device includes a primary storage unit and at least one additional unit. The primary storage unit includes a primary memory element and a primary access unit. The primary memory element is configured to store secret data. The primary storage unit is configured to receive an external access command. Each additional unit is configured to receive the external access command. Each additional unit includes an additional memory element, a local access generation element, and an additional access unit. The additional memory element is configured to store non-specific data. The local access generation element is configured to trigger an internal access command based on the external access command. The additional access unit is configured to receive a local access command. The primary storage unit and each additional unit are coupled to a same power rail and a connection wire to simultaneously receive the external access command to parallelly (simultaneously) access the secret data and the non-specific data stored in each additional unit.

An embodiment of the present invention provides a data access method applicable to a storage device. The storage device includes a primary storage unit and at least one additional unit. The primary storage unit is configured to store secret data. Each additional unit is configured to store non-specific data. The primary storage unit and the each additional unit are coupled to a same power rail and a connection wire, so that the primary storage unit and the each additional unit simultaneously receive external access commands. The data access method includes the following steps: receiving an external access command; receiving non-specific numbers; generating, based on a trigger of the external access command, access-related data according to the non-specific numbers; generating an internal access command corresponding to at least one additional unit based on the access-related data; and accessing the primary storage unit according to the external access command and accessing the each additional unit according to the internal access command in parallel (simultaneously).

An embodiment of the present invention provides a system on a chip, including the above storage device.

Based on the above, some embodiments of the present invention provide a storage device and a data access method. By disposing the primary storage unit and the each additional unit to have the same structure, and the primary storage unit and the each additional unit parallelly (simultaneously) access the secret data and the non-specific data stored in the each additional unit, it can be ensured that the power supply noise caused by the reading or writing of the primary storage unit and the each additional unit is injected into the power rail simultaneously, power supply noise injection characteristics are the same, and the power supply noise is generated with the same intensity. This makes it difficult for an attacker to separate the signal of the primary storage unit from that of other additional units during the signal analysis of the power rail to obtain the secret data of the primary storage unit.

DETAILED DESCRIPTION

The above and other technical contents, features and effects of the present invention are clearly presented in the following detailed description of the embodiments with reference to the drawings. Thicknesses or sizes of the elements in the drawings expressed in an exaggerated, omitted or general manner are used to help a person skilled in the art to understand and read, and the sizes of elements are not completely actual sizes and are not intended to limit restraint conditions under which the present invention can be implemented and therefore have no technical significance. Any modification to the structure, change to the proportional relationship or adjustment on the size should fall within the scope of the technical content disclosed by the present invention without affecting the effects and the objectives that can be achieved by the present invention. The same reference numerals are used to indicate the same or similar elements in all of the drawings.

Figure 1:
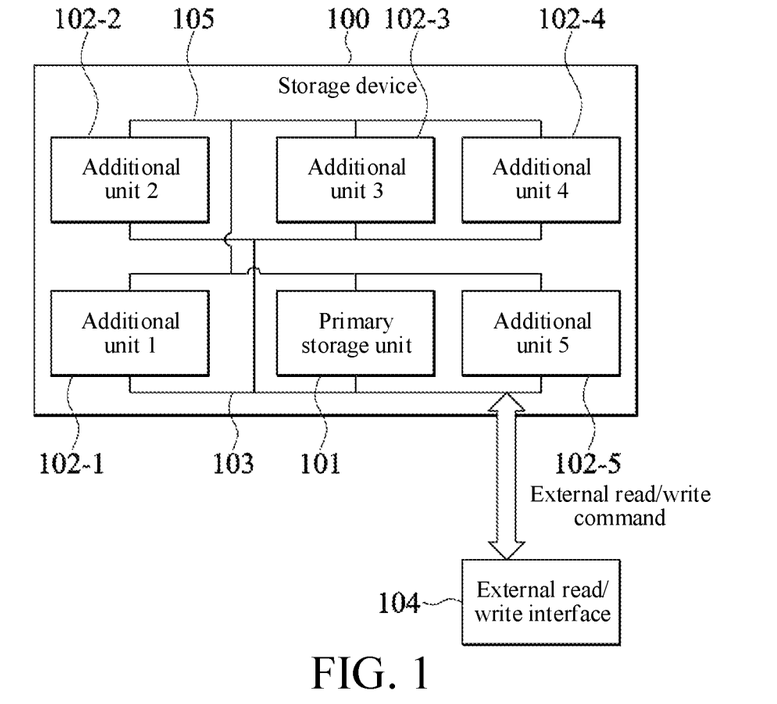
FIG. 1 shows a block diagram of a storage device and an external read/write interface according to an embodiment of the present invention.

FIG. 1 shows a block diagram of a storage device and an external read/write interface according to an embodiment of the present invention. Referring to FIG. 1, the storage device 100 includes a primary storage unit 101 and at least one additional unit 102-1 to 102-5. The primary storage unit 101 and each of additional units 102-1 to 102-5 are memory units. In addition, the primary storage unit 101 is configured to store secret data to be kept secret, and the each of the additional units 102-1 to 102-5 is configured to store non-specific data. The non-specific data may be random data that is randomly generated and meaningless. The primary storage unit 101 and the each of the additional units 102-1 to 102-5 are coupled to a same power rail 105 and a connection wire 103, so that the primary storage unit 101 and the each of the additional units 102-1 to 102-5 simultaneously receive external access commands transmitted from an external read/write interface 104.

It should be noted that although FIG. 1 only shows five additional units 102-1 to 102-5, this is only for the convenience of schematic representation. In fact, the storage device 101 may include any number of additional units. The present invention is not limited to five additional units. In addition, this embodiment also includes an implementation having only one additional unit. Moreover, the primary storage unit 101 and the each of the additional units 102-1 to 102-5 are designed to have substantially the same or similar noise generation characteristics, so that the primary storage unit 101 and the each of the additional units 102-1 to 102-5 have substantially the same or similar power supply noise injection characteristics when accessed. The power supply noise injection characteristics refer to the noise characteristics injected into the power rail 105 that supplies power to the memory elements such as the primary storage unit 101 and the each of the additional units 102-1 to 102-5 when accessed. In some embodiments of the present invention, the above noise characteristics refer to a power spectral density of the noise.

It should be noted herein that the primary storage unit 101 and the each of the additional units 102-1 to 102-5 disposed to have the same power supply noise injection characteristics when accessed refers to theoretical configuration. In a preferred embodiment, in order to achieve the above configuration that the primary storage unit 101 and the each of the additional units 102-1 to 102-5 have the same or similar power supply noise injection characteristics when accessed, the primary storage unit 101 and the each of the additional units 102-1 to 102-5 have the same structure. The primary storage unit 101 and the each of the additional units 102-1 to 102-5 have the same structure, which means the primary storage unit 101 and the each of the additional units 102-1 to 102-5 have a same type, a same size, and a same configuration. The type herein refers to a type of a memory, such as a static random access memory (SRAM), a read-only memory (ROM), or the like. The size refers to a size of the memory. The configuration refers to an internal configuration of the memory. Taking the SRAM as an example, the same configuration of the SRAM means that columns and rows, a decoder, and a multiplexer in the SRAM have the same configuration. The primary storage unit 101 and the each of the additional units 102-1 to 102-5 are disposed to have the same structure, so that the primary storage unit 101 and the each of the additional units 102-1 to 102-5 have substantially the same or similar power supply noise injection characteristics when accessed. Since the structure is only slightly different from each other, the power supply noise injection characteristics thereof should be the same. However, due to errors in the actual manufacturing process, even if the structures are the same, the power supply noise injection characteristics of the primary storage unit 101 and the each of the additional units 102-1 to 102-5 may be slightly different when accessed. Furthermore, if the structure is only slightly different from each other, the power supply noise injection characteristics of the primary storage unit and the additional unit are substantially quite similar. In other words, the primary storage unit 101 and the each of the additional units 102-1 to 102-5 have similar power supply noise injection characteristics when accessed, so as to be applicable to the present invention.

The data access method and cooperation between the elements of the storage device 100 according to some embodiments of the present invention are described in detail below with reference to the drawings.

Figure 3:
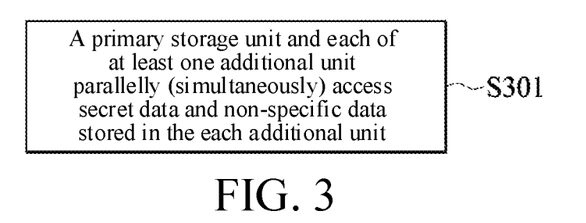
FIG. 3 shows a flowchart of a data access method according to some embodiments of the present invention.

FIG. 3 shows a flowchart of a data access method according to some embodiments of the present invention. Refer to FIG. 1 and FIG. 3 together. In step S301, the primary storage unit 101 and the each of the additional units 102-1 to 102-5 parallelly (simultaneously) access the secret data and the non-specific data stored in the each of the additional units 102-1 to 102-5. The so-called parallel (simultaneous) access means that any access operation performed by the primary storage unit 101 for the secret data stored therein is accompanied by a corresponding access operation performed by the each of the additional units 102-1 to 102-5 for the non-specific data stored therein.

In this embodiment, since the primary storage unit 101 and the each of the additional units 102-1 to 102-5 are connected to the same power rail 105, this ensures that any power supply noise caused by the reading or writing of the primary storage unit 101 and the each of the additional units 102-1 to 102-5 will be injected into the power rail 105 simultaneously. Furthermore, the primary storage unit 101 and the each of the additional units 102-1 to 102-5 have the same structure, have the same power supply noise injection characteristics, and both generate power supply noise with the same intensity. This makes it difficult for an attacker to separate the signal of the primary storage unit 101 from that of other additional units 102-1 to 102-5 during the signal analysis of the power rail 105 to obtain the secret data of the primary storage unit 101.

Figure 2:
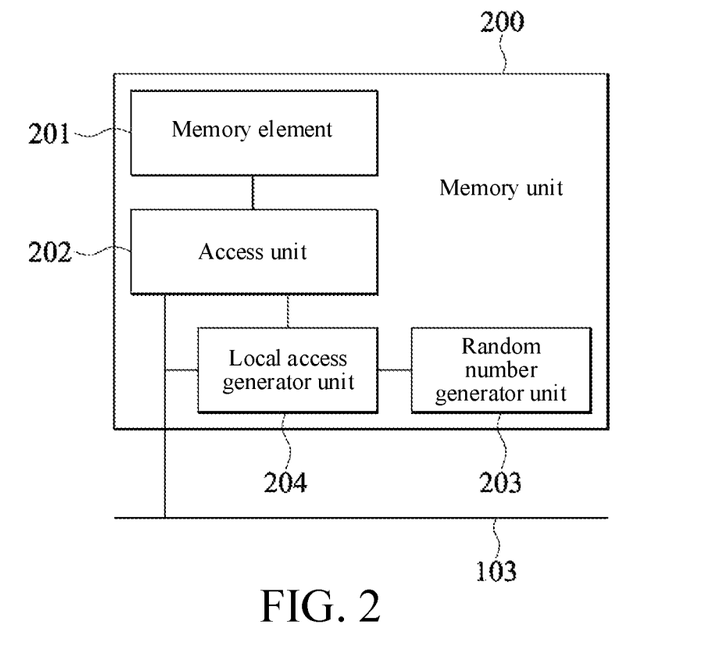
FIG. 2 shows a block diagram of a memory unit and a connection wire according to an embodiment of the present invention.
Figure 4:
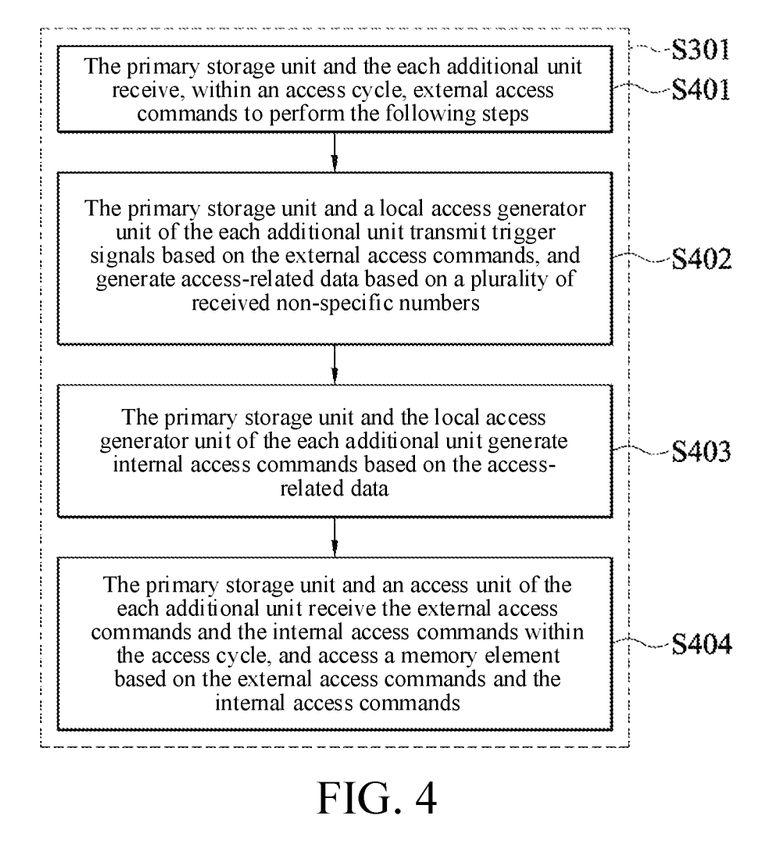
FIG. 4 shows a flowchart of a data access method according to some embodiments of the present invention.

FIG. 2 shows a block diagram of a memory unit and a connection wire according to an embodiment of the present invention. FIG. 4 shows a flowchart of a data access method according to some embodiments of the present invention. Refer to FIG. 2 and FIG. 4 together. In an embodiment of the present invention, the primary storage unit 101 and each of the additional units 102-1 to 102-5 both have the structure of the memory unit 200 shown in FIG. 2. The memory unit 200 includes a memory element 201, an access unit 202, a random number generator unit 203, and a local access generator unit 204. The local access generator unit 204 is coupled to the random number generator unit 203, and the access unit 202 is coupled to the memory element 201 and the local access generator unit 204. The random number generator unit 203 is configured to generate a plurality of non-specific numbers after receiving a trigger signal.

The memory element 201 of the primary storage unit 101 is configured to store the secret data to be kept secret, and the memory element 201 of the each of the additional units 102-1 to 102-5 is configured to store the non-specific data that is randomly generated and meaningless. The local access generator unit 204 and the access unit 202 are simultaneously coupled to the connection wire 103, and are configured to simultaneously receive external access commands transmitted from the external read/write interface 104.

In this embodiment, step S301 further includes steps S401-S404. In step S401, the primary storage unit 101 and the local access generator unit 204 and the access unit 202 of the each of the additional units 102-1 to 102-5 receive, within an access cycle of the storage device 100, the external access command from the external read/write interface 104. The primary storage unit 101 and the each of the additional units 102-1 to 102-5 receiving the external access command indicates that an authorized external device (such as a central processing unit) is to access the secret data stored in the primary storage unit 101. Generally, the external access command includes a read command and a write command. However, for the ROM, the write command may not be included. The external access command generally including the read command and the write command is to be further described in other embodiments below.

In step S402, in response to the local access generator unit 204 and the access unit 202 receiving the external access commands within the access cycle of the storage device 100, the primary storage unit 101 and the local access generator unit 204 of the each of the additional units 102-1 to 102-5 transmit the trigger signals to the respective random number generator units 203 based on the external access commands, so that the respective random number generator units 203 respectively generate a plurality of non-specific numbers. The primary storage unit 101 and the local access generator unit 204 of the each of the additional units 102-1 to 102-5 generate access-related data based on the received non-specific numbers after receiving the non-specific numbers.

In step S403, the primary storage unit 101 and the local access generator unit 204 of the each of the additional units 102-1 to 102-5 generate internal access commands based on the access-related data, and transmit the internal access commands to the access unit 202. The format of the internal access command is the same as that of the external access command. The difference is that the internal access command is generated based on the access-related data generated by the non-specific numbers. In step S404, the access unit 202 receives the internal access command generated by the local access generator unit 204, and accesses the memory element 201 based on the external access command and the internal access command. The access unit 202 of the primary storage unit 101 accesses the memory element 201 thereof based on the external access command, and the access unit 202 of the each of the additional units 102-1 to 102-5 accesses the respective memory elements 201 based on the respective internal access commands.

It should be noted that the functions of the above access unit 202 may be implemented based on a finite state machine or a combinational logic circuit.

As described above, the external access command usually includes a read command and a write command. Steps S401-S404 are described below by using the read command and the write command respectively.

Figure 5:
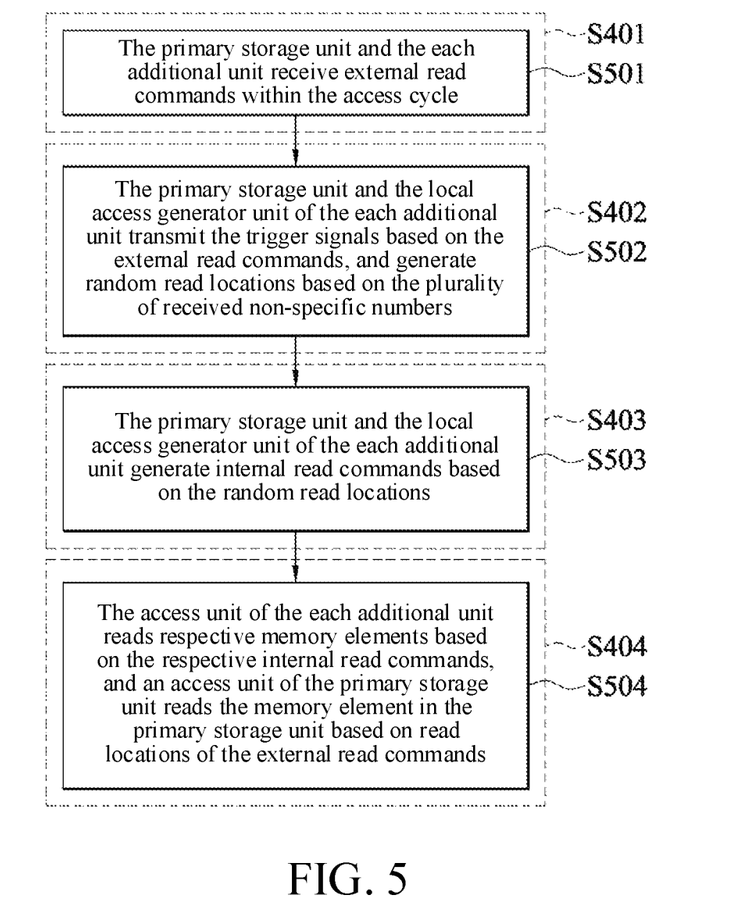
FIG. 5 shows a flowchart of a data access method according to an embodiment of the present invention.

FIG. 5 shows a flowchart of a data access method according to an embodiment of the present invention. Refer to FIG. 1, FIG. 2, and FIG. 5 together. When the external access command is an external read command, step S401 includes step S501, step S402 includes step S502, step S403 includes step S503, and step S404 includes step S504. The external read command includes a read location, which is used for indicating that the data stored in the read location of the memory element 201 is to be read. In step S501, the primary storage unit 101 and the local access generator unit 204 and the access unit 202 of the each of the additional units 102-1 to 102-5 receive, within the access cycle of the storage device 100, the external read commands from the external read/write interface 104. In step S502, in response to the local access generator unit 204 and the access unit 202 receiving the external read commands within the access cycle of the storage device 100, the primary storage unit 101 and the local access generator unit 204 of the each of the additional units 102-1 to 102-5 transmit the trigger signals to the respective random number generator units 203 based on the external read commands, so that the respective random number generator units 203 respectively generate a plurality of non-specific numbers. The primary storage unit 101 and the local access generator unit 204 of the each of the additional units 102-1 to 102-5 then receive the non-specific numbers to generate random read locations.

In step S503, the primary storage unit 101 and the local access generator unit 204 of the each of the additional units 102-1 to 102-5 generate internal read commands based on the respective random read locations, and transmit the internal read commands to the access unit 202. The format of the internal read command is the same as that of the external read command. The difference is that the internal read command includes the random read location generated based on the non-specific numbers. In step S504, the access unit 202 of the primary storage unit 101 reads the data stored in the read location in the memory element 201 of the primary storage unit 101 based on the external read command. The access unit 202 of the each of the additional units 102-1 to 102-5 reads the data stored in the random read location in the respective memory elements 201 based on the respective internal read commands.

In an embodiment of the present invention, each of the additional units 102-1 to 102-5 is disposed not to be coupled to a data bus outside the storage device 100. Such a configuration can cause the data read by the each of the additional units 102-1 to 102-5 at the random read locations in the respective memory elements 201 not to be returned. Only the data read at the read location in the memory element 201 of the primary storage unit 101 will be returned.

Figure 6:
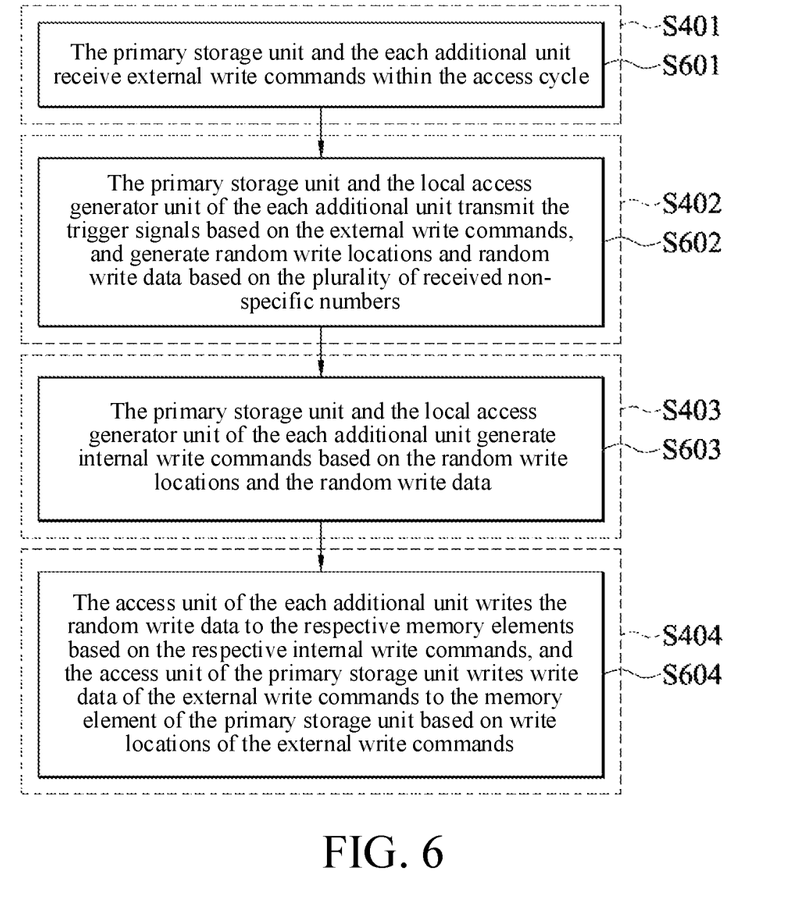
FIG. 6 shows a flowchart of a data access method according to an embodiment of the present invention.

FIG. 6 shows a flowchart of a data access method according to an embodiment of the present invention. Refer to FIG. 1, FIG. 2, and FIG. 6 together. When the external access command is an external write command, step S401 includes step S601, step S402 includes step S602, step S403 includes step S603, and step S404 includes step S604. The external write command includes a write location and write data, which is used for indicating that the write data is to be written to the write location of the memory element 201. In step S601, the primary storage unit 101 and the local access generator unit 204 and the access unit 202 of the each of the additional units 102-1 to 102-5 receive, within the access cycle of the storage device 100, the external write command from the external read/write interface 104. In step S602, in response to the local access generator unit 204 and the access unit 202 receiving the external write commands within the access cycle of the storage device 100, the primary storage unit 101 and the local access generator unit 204 of the each of the additional units 102-1 to 102-5 transmit the trigger signals to the respective random number generator units 203 based on the external write commands, so that the respective random number generator units 203 respectively generate a plurality of non-specific numbers. The primary storage unit 101 and the local access generator unit 204 of the each of the additional units 102-1 to 102-5 then receive the non-specific numbers to generate random write locations and random write data.

In step S603, the primary storage unit 101 and the local access generator unit 204 of the each of the additional units 102-1 to 102-5 generate internal write commands based on the respective random write locations and the random write data, and transmit the internal write commands to the access unit 202. The format of the internal write command is the same as that of the external write command. The difference is that the internal write command includes the random write location and the random write data generated based on the non-specific numbers. In step S604, the access unit 202 of the primary storage unit 101 writes the write data of the external write command to the memory element 201 in the primary storage unit 101 based on the write location of the external write command. The access unit 202 of the each of the additional units 102-1 to 102-5 writes the random write data to the respective memory elements 201 based on the respective internal write commands.

In the foregoing embodiment, if the primary storage unit 101 is performing a read operation, the each of the additional units 102-1 to 102-5 reads, corresponding to the read operation of the primary storage unit 101, the memory element 201 of the additional unit based on the random read location. These additional parallel (simultaneous) read operations will inject noise into the power rail, thereby masking any information content that can be obtained by analyzing the noise. If the primary storage unit 101 is performing a write operation, actual external write data and an actual external write location are used for being written to the memory element 201 of the primary storage unit 101. However, the memory elements 201 of the additional units 102-1 to 102-5 perform, according to the respective local access generator units 204 thereof, write operations based on the random write locations and the random write data generated by the random number generator unit 203. This has the effect of masking voltage variations on the power rails. The voltage variations may be seen during the write operation to the memory element 201 of the primary storage unit 101.

Since the random number generator units 203 of all of the additional units 102-1 to 102-5 are independent of each other, this means that every time specific secret data is accessed from the memory element 201 of the primary storage unit 101, different non-specific data will be read from the additional units 102-1 to 102-5. This ensures that repeated reading of the same secret data will not result in the repeatable power supply noise injection characteristics. This can further thwart any attacker who tries to isolate secret data features. The implementation of the random number generator unit 203 will be further described in subsequent embodiments.

Figure 7:
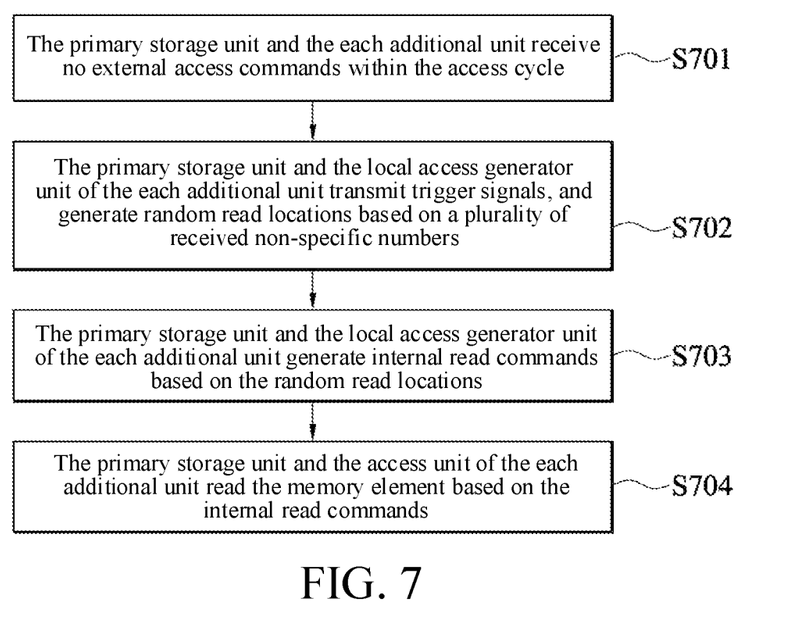
FIG. 7 shows a flowchart of a data access method according to an embodiment of the present invention.

FIG. 7 shows a flowchart of a data access method according to an embodiment of the present invention. Refer to FIG. 1, FIG. 2, and FIG. 7 together. In some embodiments of the present invention, step S301 further includes steps S701-S702. In step S701, the primary storage unit 101 and the local access generator unit 204 and the access unit 202 of the each of the additional units 102-1 to 102-5 has not received, within the access cycle of the storage device 100, the external access command from the external read/write interface 104. In step S702, in response to the local access generator unit 204 and the access unit 202 not having received the external access command from the external read/write interface 104 within the access cycle of the storage device 100, the primary storage unit 101 and the local access generator unit 204 of the each of the additional units 102-1 to 102-5 transmit the trigger signals to the respective random number generator units 203, so that the respective random number generator units 203 respectively generate a plurality of non-specific numbers. The primary storage unit 101 and the local access generator unit 204 of the each of the additional units 102-1 to 102-5 then receive the non-specific numbers to generate random read locations.

In step S703, the primary storage unit 101 and the local access generator unit 204 of the each of the additional units 102-1 to 102-5 generate internal read commands based on the respective random read locations, and transmit the internal read commands to the respective access units 202. In step S704, the primary storage unit 101 and the access unit 202 of the each of the additional units 102-1 to 102-5 reads the data stored in the random read location in the respective memory elements 201 based on the respective internal read commands.

Figure 8:
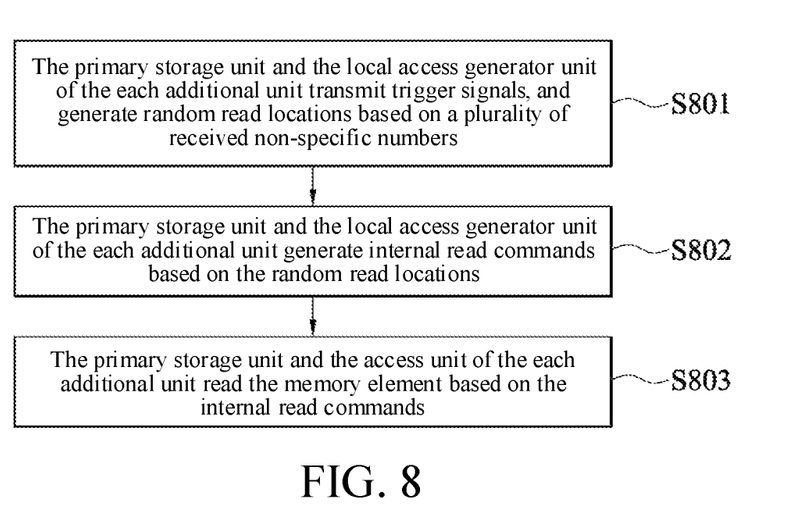
FIG. 8 shows a flowchart of a data access method according to an embodiment of the present invention.

FIG. 8 shows a flowchart of a data access method according to an embodiment of the present invention. Refer to FIG. 1, FIG. 2, and FIG. 8 together. In some embodiments of the present invention, step S301 further includes steps S801, S802, and S803 performed outside the access cycle. In step S801, the primary storage unit 101 and the local access generator unit 204 of the each of the additional units 102-1 to 102-5 transmit trigger signals to the respective random number generator units 203, so that the respective random number generator units 203 respectively generate a plurality of non-specific numbers. The primary storage unit 101 and the local access generator unit 204 of the each of the additional units 102-1 to 102-5 then receive the non-specific numbers to generate random read locations. In step S802, the primary storage unit 101 and the local access generator unit 204 of the each of the additional units 102-1 to 102-5 generate internal read commands based on the respective random read locations, and transmit the internal read commands to the respective access units 202. In step SS03, the primary storage unit 101 and the access unit 202 of the each of the additional units 102-1 to 102-5 reads the data stored in the random read location in the respective memory elements 201 based on the respective internal read commands.

In some of the foregoing embodiments, when the external access action does not occur (for example, no external access command is received from the external read/write interface 104 or outside the access cycle), the primary storage unit 101 and the each of the additional units 102-1 to 102-5 are to be always performing reading operations. Therefore, the attacker cannot detect when the actual read operation has been performed. This makes it more difficult for the attacker to achieve a successful attack.

The implementation of the random number generator unit 203 is described in the following embodiments. In some embodiments of the present invention, the random number generator unit 203 generates the non-specific numbers by using a true random number generator (TRNG). The TRNG is also referred to as a hardware random number generator, which is a device that generates random numbers by means of a physical process rather than a computer program. Such devices are usually based on microscopic phenomena that can generate low statistically random "noise" signals, such as thermodynamic noise, photoelectric effects, and quantum phenomena. These physical processes are completely unpredictable in theory and have been confirmed by experiments. A true random number generator usually includes a converter that converts certain aspects of physical phenomena into electrical signals, an amplifier that raises the amplitude of random fluctuations to a measurable level, and a type of analog-to-digital converter, which converts the output to a simple binary number 0 or 1. A series of random numbers may be obtained by repeatedly sampling randomly changing signals.

In some embodiments of the present invention, the random number generator unit 203 generates the non-specific numbers by using a pseudo random number generator (PRNG) or a cryptographically secure pseudo-random number generator (CSPRNG). The PRNG is also referred to as a deterministic random bit generator (DRBG), and is an algorithm that generates a sequence of numbers. Characteristics of the PRNG are similar to characteristics of random sequences. The CSPRNG is a pseudo-random number generator that can obtain cryptographically secure pseudo-random numbers through operations. The cryptographically secure pseudo-random numbers generated by the CSPRNG have additional pseudo-random properties.

In some embodiments of the present invention, the primary storage unit 101 and the additional units 102-1 to 102-5 are all static random access memories. In some embodiments of the present invention, the primary storage unit 101 and the additional units 102-1 to 102-5 are all read-only memories.

Figure 9:
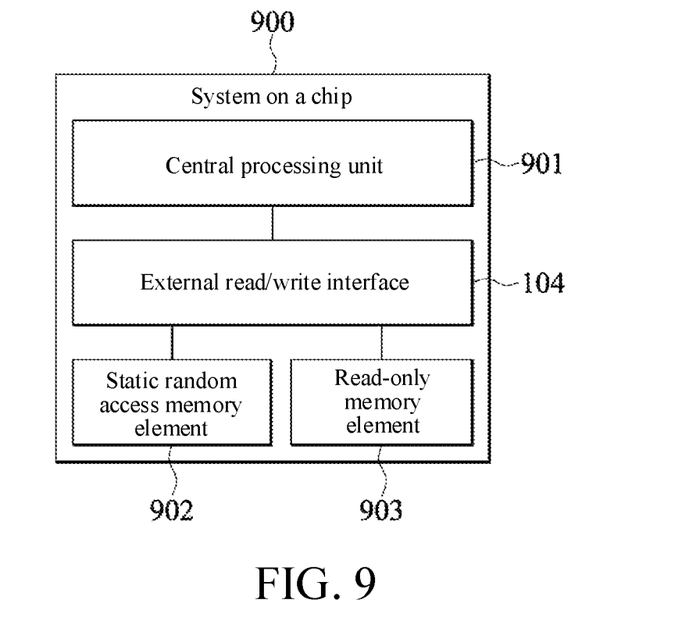
FIG. 9 shows a block diagram of a system on a chip according to an embodiment of the present invention.

FIG. 9 shows a block diagram of a system on a chip according to an embodiment of the present invention. Referring to FIG. 9, a system on a chip 900 includes a central processing unit 901, an external read/write interface 104, a static random access memory element 902, and a read-only memory element 903. The system on a chip 900 is coupled to the external read/write interface 104, and the external read/write interface 104 is coupled to the static random access memory element 902 and the read-only memory element 903. In some embodiments, the static random access memory element 902 is the storage device 100 described in any of the foregoing embodiments, and the primary storage unit 101 and the additional units 102-1 to 102-5 are static random access memories. In some embodiments, the read-only memory element 903 is the storage device 100 described in any of the foregoing embodiments, and the primary storage unit 101 and the additional units 102-1 to 102-5 are read-only memories. The central processing unit 901 accesses the static random access memory element 902 and the read-only memory element 903 through the external read/write interface 104.

It should be noted that, in the embodiment shown in FIG. 9, the storage device 100 described in the foregoing embodiments is implemented in the system on a chip. That is to say, the storage device 100 described in the foregoing embodiments is integrated into an integrated circuit of a single chip. However, the storage device 100 described in the foregoing embodiment may also be independently packaged on an independent chip to serve as an external storage chip for other systems. The present invention does not limit the storage device 100 to be integrated into the integrated circuit of the single chip.

What is claimed is:

1. A storage device, comprising:
a primary storage unit, comprising:
a primary memory element, configured to store secret data; and
a primary access unit, configured to receive an external access command and access the primary memory element according to the external access command;
at least one additional unit, configured to receive the external access command, wherein each of the at least one additional unit comprises:
an additional memory element, configured to store additional data;
a local access generator element, configured to trigger generating an internal access command based on the external access command; and
an additional access unit, configured to receive the internal access command and access the additional memory element according to the internal access command;
wherein the primary storage unit and the at least one additional unit are directly connected to a same power rail and a connection wire to simultaneously receive the external access command to simultaneously access the primary storage unit and the at least one additional unit, such that noise on the power rail from data access of the primary storage unit and the at least one additional storage unit is present on the power rail at the same time.

2. The storage device of claim 1, wherein noise generation characteristics of the primary storage unit and the at least one additional unit are substantially similar.

3. The storage device according to claim 2, wherein the structure of the primary storage unit and the at least one additional unit are substantially similar or the same.

4. The storage device of claim 1, wherein the local access generator element comprises:
a random number generator, configured to output a random number according to a trigger signal; and
a local access generator, coupled to the random number generator, configured to generate the internal access command according to the random number.

5. The storage device of claim 4, wherein
the local access generator element and the additional access unit are configured to perform, in response to receiving the external access commands within an access cycle, the following steps: (a) transmitting, by the local access generator unit, the trigger signal based on the external access command and generating access-related data based on the received random number; (b) generating the internal access commands based on the access-related data; and (c) receiving, by the additional access unit, the internal access commands, and accessing, based on a trigger of the external access command, the additional memory element according to the internal access command.

6. The storage device of claim 4, wherein when the external access command is an external read command, the internal access command is an internal read command comprising a random read address, and wherein the random read address is generated according to the random number from the random number generator.

7. The storage device of claim 4, wherein when the external access command is an external write command, the internal access command is an internal write command comprising a random write address and a random write data, and wherein the random write address and the random write data are generated according to the random number from the random number generator.

8. The storage device of claim 1, wherein the local access generator unit and the access unit are configured to simultaneously perform a read operation in response to not receiving the external access commands within the access cycle.

9. The storage device of claim 1, wherein the local access generator unit and the access unit are configured to simultaneously perform a read operation outside the access cycle.

10. The storage device of claim 4, wherein the random number generator comprises one of a true random number generator (TRNG), a pseudo random number generator (PRNG), and a cryptographically secure pseudo-random number generator.

11. A data access method, applicable to a storage device comprising a primary storage unit and at least one additional unit, wherein the primary storage unit and each of the at least one additional unit are directly connected to a same power rail and a connection wire, the data access method comprising the following steps:
   simultaneously receiving, in the primary storage unit and the at least one additional unit, an external access command;
   generating, in the at least one additional unit, an internal access command according to a random number and triggering of the external access command;
   simultaneously accessing the primary storage unit and the at least one additional unit, wherein the primary storage is accessed according to the external access command and accessing the at least one additional unit is accessed according to the internal access command, such that noise on the power rail from data access of the primary storage unit and the at least one additional storage unit is present on the power rail at the same time.

12. The data access method of claim 11, wherein the primary storage unit and the at least one additional unit are configured to perform, in response to receiving the external access commands within the access cycle, steps of:
   (a) transmitting, by the at least one additional unit, the trigger signal based on the external access command, and generating the access-related data based on the received random number;
   (b) generating, by the primary storage unit and the at least one additional unit, the internal access command based on the access-related data; and
   (c) receiving, by the primary storage unit and the at least one additional unit, the internal access command, and accessing, based on the external access command and the internal access command, the secret data and additional data.

13. The data access method of claim 11, wherein the primary storage unit and the each of the at least one additional unit are configured to perform a read operation, in response to not receiving the external access commands within an access cycle.

14. The data access method of claim 12, wherein the primary storage unit and the each of the at least one additional unit are configured to simultaneously perform a read operation, outside an access cycle.

15. The data access method of claim 12, wherein the random number is generated from one of a true random number generator (TRNG), a pseudo random number generator (PRNG), and a cryptographically secure pseudo-random number generator.

16. The data access method of claim 12, wherein the primary storage unit and the at least one additional unit are the same and selected from one of a random access memory (RAM) and a read-only memory (ROM).

17. The data access method of claim 12, wherein noise generation characteristics of the primary storage unit and the at least one additional unit are substantially similar.

18. The data access method of claim 17, wherein the structure of the primary storage unit and the at least one additional unit are substantially similar or the same.

19. A storage device, comprising:
   a primary storage unit, comprising:
   a primary memory element, configured to store secret data; and
   a primary access unit, configured to receive an external access command and access the primary memory element according to the external access command;
   at least one additional unit, configured to receive the external access command, wherein each of the at least one additional unit comprises:
   an additional memory element, configured to store additional data;
   a local access generator element, configured to trigger generating an internal access command based on the external access command; the local access generator element comprising:
   a random number generator, configured to output a random number; and
   a local access generator, coupled to the random number generator, configured to generate the internal access command according to the random number; and
   an additional access unit, configured to receive the internal access command and access the additional memory element according to the internal access command;
   wherein the primary storage unit and the at least one additional unit are coupled to a same power rail and a connection wire to simultaneously receive the external access command to simultaneously access the primary storage unit and the at least one additional unit.

* * * * *